United States Patent [19]

Waskiewicz

[11] Patent Number: 5,122,256
[45] Date of Patent: Jun. 16, 1992

[54] METHOD FOR SELECTIVELY COATING SURFACES OF COMPONENTS

[76] Inventor: Walter P. Waskiewicz, 50 Purdue Rd., Bristol, Conn. 06010

[21] Appl. No.: 705,665

[22] Filed: May 24, 1991

[51] Int. Cl.$^5$ ................................................ C25D 5/02
[52] U.S. Cl. .................................................. 205/135
[58] Field of Search ........................................ 204/15

[56] References Cited

U.S. PATENT DOCUMENTS 1,862,231  6/1932  McFarland ...................... 204/18.1
3,511,758  5/1970  Bedi ................................... 204/15

Primary Examiner—T. M. Tufariello
Attorney, Agent, or Firm—Michael H. Minns; John C. Bigler

[57] ABSTRACT

A method of selectively coating surfaces of bearing races by first electroplating a first material on a bearing raceway. Then a second material is deposited only onto the remaining surfaces of the bearing race. The second material is selected from a group of materials which do not deposit onto surfaces containing the first material.

6 Claims, No Drawings

METHOD FOR SELECTIVELY COATING SURFACES OF COMPONENTS

BACKGROUND OF THE INVENTION

This invention relates generally to a method for electroplating components and more particularly to a method for selectively electroplating one surface with a first material and coating a second surface with a second material.

The unprotected steel components typically used for bearing parts are adversely affected by many hostile application environments. A wide variety of protective coatings are used to minimize part deterioration caused by corrosion, wear, etc. However, there are instances where a single coating may not be sufficient or cost effective in eliminating the problem.

Chromium is widely used to prevent corrosion, reduce wear, and lower friction. Chromium is relatively costly and in certain applications will generate a strong galvanic cell with adjoining materials. This is particularly true in airframes where chromium coated bearings installed in aluminum housings are unacceptable. However, the previously noted properties of chromium are very desirable for internal bearing surfaces.

Applying chromium to the internal surfaces of a bearing and an acceptable coating to the external surfaces, such as cadmium, has proven very difficult and costly. Extensive manual masking is needed to protect the first coating deposited while the second coating is being applied.

The foregoing illustrates limitations known to exist in present methods for selectively coating components. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of selectively coating surfaces of components by first electroplating a first material on a first surface. Then a second material is deposited only on a second surface. The second material is selected from a group of materials which do not deposit onto surfaces containing the first material.

The foregoing and other aspects will become apparent from the following detailed description of the invention.

DETAILED DESCRIPTION

This invention is a method for electroplating a first corrosion resistant bearing material, such as chromium, on the bearing raceway surface and then depositing a second corrosion resistant material, such as zinc phosphate, on the remaining surfaces of the bearing component without affecting the first material.

The preferred embodiment of this method is the plating of thin dense chromium on bearing raceways, followed by depositing zinc phosphate on the remaining surfaces of the bearing race. However, this method is applicable to the selective coating of other components besides bearing races.

By proper design of plating racks and anode placement in the plating tank, selected part surfaces can be chromium plated without masking the remaining surfaces. The bearing raceway surface of either an inner race or an outer race can be selectively electroplated with chromium using this method. The application of chromium is the first step in this process.

The preferred chromium plating is a hard chromium, also known as thin dense chromium, rather than a bright decorative chromium. Typically, the thin dense chromium has a thickness of less than 0.001 inch and has a hard, crack free surface.

The bearing components are then cleaned using a neutral solvent degreaser. The cleaning solution must be compatible with chromium to prevent any degradation or damage of the chromium plating.

Following cleaning, the remaining surfaces are coated with zinc phosphate. There are many bath formulations and processing systems available for producing zinc phosphate coatings. These bath formulations require the presence of a reactive metal surface, typically steel. Chromium is not reactive to zinc phosphate chemistry, provided the concentration of acids, HCl, $H_2SO_4$ or any other damaging materials, is kept low. The process has been found effective with acid concentrations below 5%. As a result of the chromium not being reactive to zinc phosphate bath chemistry, the surfaces of the component plated with chromium will not be coated with zinc phosphate.

Other phosphate coatings, such as manganese phosphate, may be used in place of the zinc phosphate.

Bearing inner races have been successfully selectively coated with chromium and zinc phosphate. The bearing raceway and adjoining surface were first chromium plated with a thin dense chromium 0.0001 inch thick. This was followed by cleaning with a chromium compatible solution and then phosphating using a Lea Manufacturing R-40 solution and rinsing with water. The result was a part with differing coatings applied to the desired surfaces without any masking.

The method of this invention is the selective coating of a first coating onto a first surface of a component. The component is then rinsed using cleaners or degreasers which do not react with the first coating or degrade the first coating. The remaining surfaces of the component are then coated with a second coating using a chemistry which does not react with the first coating or degrade the first coating. This results in the second coating not being deposited on the first coating. Thus, the second coating is selectively deposited without the use of manual masking as required in the prior art.

Having described the invention, what is claimed is:

1. A method of selectively coating surfaces of a component, the method comprising the steps of:

selectively electroplating chromium onto a first surface of the component, the chromium plating being restricted through the design of plating racks and anode placement;

cleaning the component using a chromium compatible solution; and depositing a second material onto a second surface of the component using a bath formulation having an acidity level kept sufficiently low to limit reaction with the chromium, the second material being a phosphate taken from a group consisting essentially of zinc phosphate, manganese phosphate and obvious equivalents thereof.

2. The method according to claim 1, wherein the bath formulation has an acidity level of no more than 5 percent.

3. The method according to claim 1, wherein the second material is zinc phosphate.

4. A method of selectively coating surfaces of a bearing race, the bearing race having a bearing raceway, the method comprising the steps of:
- electroplating chromium onto the bearing raceway, the chromium plating being restricted at least to the bearing raceway and adjacent surfaces through the design of plating racks and anode placement;
- cleaning the bearing races using a chromium compatible solution; and
- coating at least a portion of the remaining surfaces of the bearing race with zinc phosphate using a bath formulation having an acidity level sufficiently low to limit reaction with the chromium.

5. The method according to claim 3, wherein the bath formulation has an acidity of no more than 5 percent.

6. A method of selectively coating surfaces of a bearing race, the bearing race having a bearing raceway, the method comprising the steps of:
- electroplating thin dense chromium onto the bearing raceway, the thin dense chromium plating being restricted at least to the bearing raceway and adjacent surfaces through the design of the plating racks and anode placement;
- cleaning the bearing races using a chromium compatible solution; and
- coating the remaining surfaces of the bearing race with zinc phosphate, the acid concentration being less than 5%.

* * * * *